United States Patent
Kwon et al.

(10) Patent No.: US 9,145,965 B2
(45) Date of Patent: Sep. 29, 2015

(54) RUBBER COATED CHAIN SPROCKET

(71) Applicant: Hyundai Motor Company, Seoul (KR)

(72) Inventors: Hee Do Kwon, Gunpo-si (KR); Kye Oong Song, Yongin-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 9 days.

(21) Appl. No.: 14/109,724

(22) Filed: Dec. 17, 2013

(65) Prior Publication Data

US 2015/0045165 A1 Feb. 12, 2015

(30) Foreign Application Priority Data

Aug. 9, 2013 (KR) ........................ 10-2013-0094801

(51) Int. Cl.
*F16H 55/06* (2006.01)
*F16H 55/30* (2006.01)

(52) U.S. Cl.
CPC ...................................... *F16H 55/30* (2013.01)

(58) Field of Classification Search
CPC ..... F16H 55/30; F16H 2055/306; F16H 7/06; F16H 55/06; B62D 55/0963
USPC .................................................. 474/161, 164
See application file for complete search history.

(56) References Cited

U.S. PATENT DOCUMENTS

| | | | | |
|---|---|---|---|---|
| 975,938 A * | 11/1910 | Downey | .......................... | 474/161 |
| 1,808,369 A * | 6/1931 | Munroe | .......................... | 474/156 |
| 2,491,974 A * | 12/1949 | Hansen | .......................... | 198/330 |
| 2,953,930 A * | 9/1960 | Meyer | .......................... | 474/148 |
| 3,469,465 A * | 9/1969 | Cozzarin et al. | ............... | 474/161 |
| 4,227,422 A * | 10/1980 | Kawashima et al. | .......... | 474/156 |
| 4,261,214 A * | 4/1981 | Watanabe et al. | .............. | 474/156 |
| 4,332,574 A * | 6/1982 | Aoyama et al. | ............... | 474/161 |
| 4,348,199 A * | 9/1982 | Oonuma et al. | ............... | 474/156 |
| 4,867,733 A * | 9/1989 | Yamanoi et al. | .............. | 474/161 |
| 5,224,903 A * | 7/1993 | Langhof et al. | ............... | 474/152 |
| 5,360,378 A * | 11/1994 | Suzuki et al. | ................. | 474/161 |
| 5,819,910 A * | 10/1998 | Langer et al. | ................. | 198/834 |
| 5,980,408 A * | 11/1999 | Schulz | .......................... | 474/161 |
| 5,984,817 A * | 11/1999 | Schulz | .......................... | 474/156 |
| 6,179,741 B1 * | 1/2001 | Young | ........................... | 474/161 |
| 6,371,874 B1 * | 4/2002 | Inoue | ............................ | 474/156 |
| 6,652,402 B2 * | 11/2003 | Poiret et al. | .................... | 474/156 |
| 6,656,072 B2 * | 12/2003 | Sugita et al. | ................... | 474/161 |
| 7,074,147 B2 * | 7/2006 | Young | ............................ | 474/161 |

(Continued)

FOREIGN PATENT DOCUMENTS

| | | |
|---|---|---|
| JP | 7-18059 U | 3/1995 |
| JP | 2000-198483 A | 7/2000 |

(Continued)

*Primary Examiner* — Henry Liu
(74) *Attorney, Agent, or Firm* — Morgan, Lewis & Bockius LLP

(57) ABSTRACT

A rubber-coated chain sprocket, may include a body into which a rotation shaft is inserted, a teeth bottom portion having a wave shape along the outer edge of the body, wherein the teeth bottom portion receives a chain bush therein, a shoulder portion projecting in both side directions along the inner edge of the teeth bottom, and a rubber coating portion formed of rubber material and covering the edge of the shoulder portion, wherein the rubber coating portion has projections along the outer edge at a regular interval, such that a chain plate presses and makes close contact with one of the projections.

9 Claims, 3 Drawing Sheets

(56) References Cited

U.S. PATENT DOCUMENTS

| | | | |
|---|---|---|---|
| 7,094,170 B2* | 8/2006 | Young | 474/161 |
| 8,202,185 B2* | 6/2012 | Haesloop | 474/161 |
| 2002/0169044 A1* | 11/2002 | Young | 474/152 |
| 2003/0186766 A1 | 10/2003 | Wang et al. | |
| 2006/0073927 A1* | 4/2006 | Haesloop | 474/161 |
| 2007/0111833 A1* | 5/2007 | Young | 474/152 |
| 2009/0093329 A1* | 4/2009 | Markley et al. | 474/161 |
| 2009/0118047 A1* | 5/2009 | Haesloop | 474/161 |
| 2011/0300977 A1* | 12/2011 | Hayami et al. | 474/161 |

FOREIGN PATENT DOCUMENTS

| | | |
|---|---|---|
| JP | 2007-9973 A | 1/2007 |
| JP | 2011-256886 A | 12/2011 |
| WO | WO 2010/080744 A2 | 7/2010 |

\* cited by examiner

RUBBER COATED CHAIN SPROCKET

CROSS REFERENCE TO RELATED APPLICATION

The present application claims priority to Korean Patent Application No. 10-2013-0094801 filed Aug. 9, 2013, the entire contents of which is incorporated herein for all purposes by this reference.

BACKGROUND OF THE INVENTION

1. Field of the Invention

The present invention relates to a rubber-coated chain sprocket capable of reducing noise and vibration by absorbing impact applied when a chain meshes with a sprocket.

2. Description of Related Art

Recently, as an item for improving the durability of an engine, a timing chain is widely employed. However, the timing chain causes complaint by users due to noise incurred.

Such a problem is serious especially in a diesel engine because it has bigger torsional vibration transmitted from a crank shaft than a gasoline engine. Although manufacturers of vehicles that employ engines with timing chains (especially diesel engines) are seeking a solution to overcome the noise issue, there has been no breakthrough yet.

The whine noise of a chain is caused by impact applied when the chain meshes with a chain sprocket. To eliminate this, it is necessary to reduce or absorb the impact applied when the chain meshes with the sprocket.

To this end, there has been an attempt to reduce the noise by coating a sprocket with elastic material. However, with the shapes according to the related art, desired effect wasn't obtained.

The matters described as the related art have been provided only for facilitating the understanding of the background of the present invention and should not be construed as acknowledging them as the prior art already known to those skilled in the art.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a rubber-coated chain sprocket capable of reducing noise and vibration by absorbing impact applied when a chain meshes with a sprocket.

In an aspect of the present invention, a rubber-coated chain sprocket may include a body, a teeth bottom portion formed to the body and having a wave shape along an outer edge of the body, wherein the teeth bottom portion is configured to receive a chain bush therein, a shoulder portion projecting in both side directions of the body along an inner edge of the teeth bottom portion, and a rubber coating portion formed of rubber material and covering an outer edge of the shoulder portion, wherein the rubber coating portion may have projections along the outer edge at a regular interval in a circumferential direction of the body, such that a chain plate fixing the chain bush presses and makes close contact with one of the projections.

Each of the projections may project at a location corresponding to the lowest position of the receiving groove of the teeth bottom portion in which the chain bush is received.

The projections may project in an arc and may be eccentric to one side and thus project eccentrically to the one side.

Each of the projections may project at a location corresponding to the lowest position of the receiving groove of the teeth bottom portion in which the chain bush is received, and may be eccentric to one side with respect to the lowermost end of the receiving groove and thus project eccentrically to the one side.

The projections may project eccentrically in the rotating direction of the body.

The projecting height of the projections may be determined so that the chain plate reaches the projection before at least the chain bush reaches the lowest point of the receiving groove of the teeth bottom portion.

Each of the projections may be pressed and deformed by the chain plate, and the chain bush may be received in the lower position of the receiving groove of the teeth bottom portion when the projections are deformed.

The shoulder portion may project perpendicularly to the both side surfaces of the body along the inner edge of the teeth bottom portion.

The rubber coating portion may have predetermined thickness and width so as to cover the outer surface of the shoulder portion, the outer surface of the rubber coating portion may be planar, and the projections may project to have an arc cross-section of the same width from the outer surface of the rubber coating portion.

The width of the rubber coating portion may be smaller than that of the outer surface of the shoulder portion.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
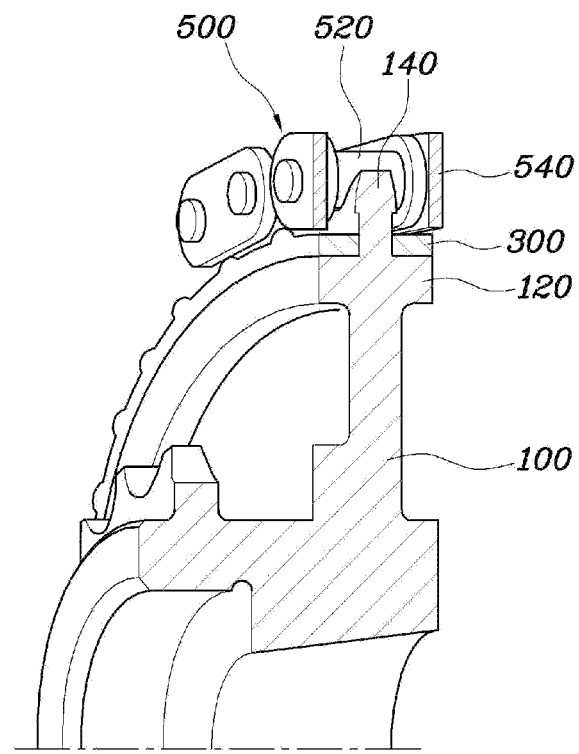
FIG. 1 is a perspective view of a rubber-coated chain sprocket according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, a rubber-coated chain sprocket according to an exemplary embodiment of the present invention will be described in detail with reference to the accompanying drawings.

Figure 2:
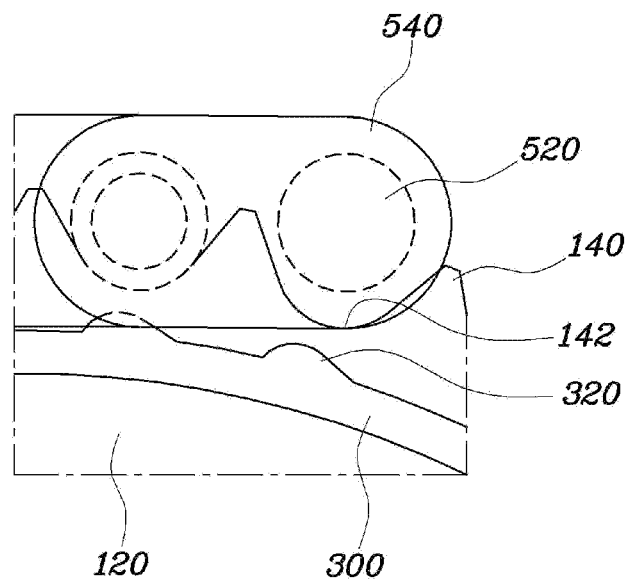
FIGS. 2 to 4 are views showing the operation of a rubber-coated chain sprocket according to an exemplary embodiment of the present invention.
Figure 3:
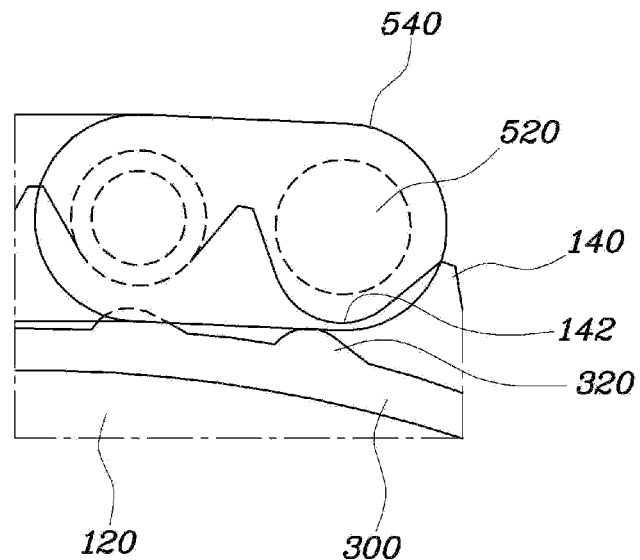
Figure 4:
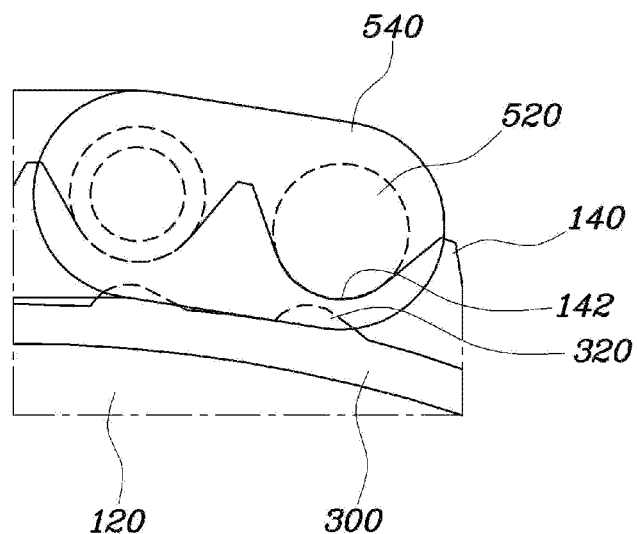
Figure 5:
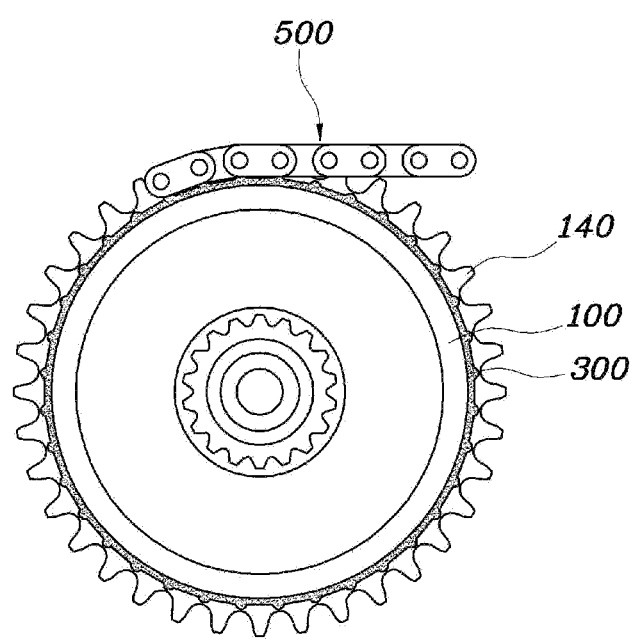
FIG. 5 is a perspective view of the whole rubber-coated chain sprocket according to an exemplary embodiment of the present invention.

FIG. 1 is a perspective view of a part of a rubber-coated chain sprocket according to an exemplary embodiment of the present invention, FIG. 5 is a perspective view of the whole rubber-coated chain sprocket, and FIGS. 2 to 4 are views showing the operation of the rubber-coated chain sprocket.

The rubber-coated chain sprocket includes: a body 100 into which a rotation shaft is inserted, a teeth bottom portion 140 having a wave shape along the outer edge of the body 100, wherein a chain bush 520 is located thereon, a shoulder portion 120 projecting in both side directions along the inner edge of the teeth bottom portion 140, and a rubber coating portion 300 formed of rubber material and covering the edge of the shoulder portion 120, wherein the rubber coating portion 300 has projections 320 along the outer edge at a regular interval, such that a chain plate 540 presses and makes close contact with one of the projections 320.

A sprocket is commonly used for engaging a timing chain of an engine passing over it, and includes the body 100 into which the rotation shaft is inserted and the teeth bottom portion 140 formed along the outer edge of the body. The teeth bottom portion 140 has a wave shape along the outer edge of the body 100 so that the chain bush 520 is located thereon.

In addition, the body 100 has the shoulder portion 120 that is concentric with the teeth bottom portion 140 at an inner side thereof and projects in both side directions along the inner edge of the teeth bottom portion 140. The shoulder portion 120 projects perpendicularly to both side surfaces of the body 100 along the inner edge of the teeth bottom portion 140 such that it is formed as a wing such as a flange. The outer surface is covered with the rubber coating portion 300.

With this configuration, as shown in FIG. 1, the chain bush 520 is in contact with a receiving groove 142 of the teeth bottom portion 140, and the chain plate is in direct contact with the rubber coating portion 300, not with the shoulder portion 120.

The rubber coating portion 300 is formed of rubber material covering the shoulder portion 120. The rubber coating portion 300 has projections 320 along the outer edge at a regular interval, such that the chain plate 540 presses and makes close contact with the projections 320.

Accordingly, as can be seen from FIGS. 2 to 4, while the chain is wrapped over the sprocket, the chain plate 540 reaches the projection 320 of the rubber coating portion 300 firstly, the chain plate 540 presses and deforms the projections 320 as the chain is wrapped over the sprocket more and more, and finally the chain bush 520 is received in the receiving groove 142 of the teeth bottom portion 140.

Therefore, compared to a simple ring-like rubber coating portion with no projection according to the related art, the chain and the sprocket may be coupled more strongly, and friction, noise and vibration may be remarkably reduced. According to the related art, since the rubber coating portion has a smooth ring shape with no projection, the chain plate is in contact with the rubber coating portion. Further, when pressed, the rubber coating portion has limited deformation so that it is difficult for the chain bush to be firmly received in the receiving groove of the teeth bottom portion. Therefore, a gap is made between the receiving groove and the chain bush so that the rattle is increased.

According to an exemplary embodiment of the present invention, however, the projections 320 are formed on the rubber coating portion 300 such that the projections 320 make contact with the chain plate 540 to be deformed. By doing so, the chain plate 540 is in close contact with the projections 320 to receive impact and accordingly the chain bush 520 is firmly received in the receiving groove 142 of the chain bush 520 so that no gap is made therebetween. As a result, the rattle between the chain bush 520 and the receiving groove 142 may be reduced.

Incidentally, the projections 320 may project at a location corresponding to the lowest position of the receiving groove 142 of the teeth bottom portion 140 in which the chain bush 520 is received. Thanks to the positional relationship, the chain plate 540 firstly makes contact with the projections 320 as it approaches the sprocket, and the chain bush 520 is received in the receiving groove 142 after impact by the chain plate 540 is absorbed.

Further, the projections 320 project in an arc and are eccentric to one side and thus project eccentrically to the one side. Namely, the projections 320 have an arc shape so that they stably absorb the impact transferred from the chain plate 540, and are eccentric to one side so that the contact area with the chain plate 540 is maximally enlarged.

That is to say, the projections 320 may project at a location corresponding to the lowest position of the receiving groove 142 of the teeth bottom portion 140 in which the chain bush 520 is received, and are eccentric to one side with respect to the lowest position of the receiving groove 142 and thus project eccentrically to the one side. Further, the projections 320 may project eccentrically in the rotating direction of the body 100.

As shown in FIGS. 2 to 4, the projections 320 may project in an arc and are eccentric in the rotating direction of the sprocket, such that larger portions of the projections 320 with respect to the top dead center make contact with the chain plate 540. By providing maximum contact area as described above, the area that absorbs the impact transferred from the chain plate 540 is also increased. Additionally, the projections 320 are eccentric such that the larger portion with respect to the top of the projections 320 receives the chain plate 540 to absorb impact, and the smaller portion supports the impact from behind.

Specifically, Table 1 below shows the results of comparing non-eccentric projections with eccentric projections according to an exemplary embodiment of the present invention.

TABLE 1

| Comparison Items | | Eccentric projection | Non-eccentric projection | Cause |
|---|---|---|---|---|
| Rubber coating portion | Impact amount | Advantageous | Disadvantageous | Impact speed: Eccentric projection < Non-eccentric projection |
| | Weight distribution | Advantageous | Disadvantageous | Contact area: Eccentric projection > Non-eccentric projection |
| | Durability | Advantageous | Disadvantageous | Weight applied per area: Eccentric projection > Non-eccentric projection |
| | Compression rate | Equivalent | Equivalent | Pressed height: equivalent(similar) |
| Chain plate | Impact amount | Advantageous | Disadvantageous | Distance between chain bush and projection: Eccentric projection < Non-eccentric projection |

Incidentally, the projecting height of the projections 320 may be determined such that the chain plate 540 makes contact with the projections 320 before the chain bush 520 makes contact with the lowest position of the receiving groove 142 of the teeth bottom portion 140. Accordingly, the projections 320 are pressed and deformed by the chain plate 540, and the chain bush 520 may be received in the lowest position of the receiving groove 142 of the teeth bottom portion 140 when the projections 320 are deformed. By designing with the height thus determined, the rattle occurring when the chain bush 520 and the teeth bottom portion 140 hit each other may be significantly decreased. Without the projections 320, the overall thickness of the rubber coating portion 300 itself need to be increased, such that it results in problems such as increase in weight, lack of chain bonding and increase of rattling noise.

In addition, the rubber coating portion 300 has predetermined thickness and width so as to cover the outer surface of the shoulder portion 120. The outer surface of the rubber coating portion 300 is planar. The projections 320 may project to have an arc cross-section of the same width from the outer surface of the rubber coating portion 300. By doing so, the rubber coating portion 300 may stably absorb the impact from the chain plate 540 and stably maintain the contact with the chain plate 540, thereby reducing friction noise between the chain bush 520 and the teeth bottom portion 140. Incidentally, the width of the rubber coating portion 300 is determined such that it is smaller than the width of the outer surface of the shoulder portion 120, thereby preventing the rubber coating portion 300 from deviating to increase the durability.

The rubber-coated chain sprocket thus configured optimizes the shape of coated rubber to thereby reduce noise and vibration.

Further, the rubber-coated chain sprocket is designed with light material and shape, to thereby save cost and increase fuel-efficiency.

According to the rubber-coated chain sprocket thus configured, the shape of the coated rubber is optimized to thereby reduce noise and vibration.

Further, the rubber-coated chain sprocket is designed with light material and shape, to thereby save cost and increase fuel-efficiency.

Although the present invention has been described with reference to particular embodiments, it will be obvious to one skilled in the art that various changes and modifications can be made to the present invention without departing from the scope of the present invention defined in the appended claims.

For convenience in explanation and accurate definition in the appended claims, the terms "upper", "lower", "inner" and "outer", are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A rubber-coated chain sprocket, comprising:
    a body;
    a teeth bottom portion formed to the body and having a wave shape along an outer edge of the body, wherein the teeth bottom portion is configured to receive a chain bush therein;
    a shoulder portion projecting in both side directions of the body along an inner edge of the teeth bottom portion; and
    a rubber coating portion formed of rubber material and covering an outer edge of the shoulder portion,
    wherein the rubber coating portion has projections along the outer edge at a regular interval in a circumferential direction of the body, such that a chain plate fixing the chain bush presses and makes close contact with one of the projections, and
    wherein the projections project in an arc and are eccentric to one side and thus project eccentrically to the one side.

2. The rubber-coated chain sprocket according to claim 1, wherein each of the projections projects at a location corresponding to a lowest position of the receiving groove of the teeth bottom portion in which the chain bush is received.

3. The rubber-coated chain sprocket according to claim 1, wherein each of the projections projects at a location corresponding to a lowest position of the receiving groove of the teeth bottom portion in which the chain bush is received, and is eccentric to the one side with respect to a lowermost end of the receiving groove and thus projects eccentrically to the one side.

4. The rubber-coated chain sprocket according to claim 1, wherein the projections project eccentrically in a rotating direction of the body.

5. The rubber-coated chain sprocket according to claim 1, wherein a projecting height of the projections is determined so that the chain plate reaches the projection before at least the chain bush reaches a lowest point of the receiving groove of the teeth bottom portion.

6. The rubber-coated chain sprocket according to claim 5, wherein each of the projections is pressed and deformed by the chain plate, and the chain bush is received in the lower position of the receiving groove of the teeth bottom portion when the projections are deformed.

7. The rubber-coated chain sprocket according to claim 1, wherein the shoulder portion projects perpendicularly to the both side surfaces of the body along the inner edge of the teeth bottom portion.

8. The rubber-coated chain sprocket according to claim 1, wherein the rubber coating portion has predetermined thickness and width so as to cover an outer surface of the shoulder portion, wherein an outer surface of the rubber coating portion is planar, and wherein the projections project to have an arc cross-section of the same width from the outer surface of the rubber coating portion.

9. The rubber-coated chain sprocket according to claim 8, wherein a width of the rubber coating portion is smaller than that of an outer surface of the shoulder portion.

* * * * *